United States Patent
Reichel et al.

(10) Patent No.: US 8,043,402 B2
(45) Date of Patent: Oct. 25, 2011

(54) METHOD FOR THE PRODUCTION OF A FOAMED SLAG IN A METAL BATH

(75) Inventors: Johann Reichel, Düsseldorf (DE); Lutz Rose, Duisburg (DE); Miroslav Karbowniczek, Krakow (PL)

(73) Assignee: SMS Siemag Aktiengesellschaft, Duesseldorf (DE)

( * ) Notice: Subject to any disclaimer, the term of this patent is extended or adjusted under 35 U.S.C. 154(b) by 0 days.

(21) Appl. No.: 12/223,416

(22) PCT Filed: Jan. 15, 2007

(86) PCT No.: PCT/EP2007/000291
§ 371 (c)(1),
(2), (4) Date: Feb. 9, 2009

(87) PCT Pub. No.: WO2007/087979
PCT Pub. Date: Aug. 9, 2007

(65) Prior Publication Data
US 2009/0255375 A1    Oct. 15, 2009

(30) Foreign Application Priority Data
Feb. 1, 2006 (DE) .......... 10 2006 004 532

(51) Int. Cl.
*C21B 13/12* (2006.01)
(52) U.S. Cl. .................. 75/10.46; 75/10.59; 65/20
(58) Field of Classification Search ........... 75/10.46, 75/10.59; 65/20
See application file for complete search history.

(56) References Cited

U.S. PATENT DOCUMENTS

| | | | | | |
|---|---|---|---|---|---|
| 4,113,468 | A | * | 9/1978 | Gudenau et al. | 75/10.47 |
| 5,916,827 | A | * | 6/1999 | Vayda | 44/580 |
| 2002/0040623 | A1 | * | 4/2002 | Stendera et al. | 75/10.12 |
| 2006/0260435 | A1 | * | 11/2006 | Rose et al. | 75/10.61 |

FOREIGN PATENT DOCUMENTS

| | | | |
|---|---|---|---|
| CA | 2129407 | * | 8/1994 |
| DE | 26 08 320 | | 7/1977 |
| EP | 0 637 634 | | 2/1995 |
| EP | 0 829 545 | | 3/1998 |
| RU | 2103377 | | 1/1998 |
| WO | 99/23264 | | 5/1999 |
| WO | 01/72090 | | 9/2001 |
| WO | 2004/104232 | | 12/2004 |

* cited by examiner

*Primary Examiner* — George Wyszomierski
*Assistant Examiner* — Tima M McGuthry Banks
(74) *Attorney, Agent, or Firm* — Lucas & Mercanti, LLP; Klaus P. Stoffel

(57) ABSTRACT

A method for producing a foamed slag (1) on a metal bath (2) in a metallurgical furnace (3), in which a mixture (4) containing at least one metal oxide and carbon is introduced into the furnace (3), the metal oxide is reduced by the carbon below the slag (1) that is located there, and the gases produced during the reduction process form bubbles such that the slag is foamed. In order to optimize the formation of foamed slag, the mixture (4) is delivered into the furnace (3) in such a way that a desired height (h) or a desired section of the height (h) of the layer of foamed slag (1) is generated or maintained.

11 Claims, 2 Drawing Sheets

METHOD FOR THE PRODUCTION OF A FOAMED SLAG IN A METAL BATH

This application is a national stage entry of PCT/EP2007/000291 filed Jan. 15, 2007.

BACKGROUND OF THE INVENTION

The invention concerns a method for producing a foamed slag in a metal bath in a metallurgical furnace, in which a mixture that contains at least a metal oxide and carbon is introduced into the furnace, where below the slag present in the furnace, the metal oxide is reduced by the carbon, where the gases formed during the reduction form bubbles in the slag, thereby foaming the slag, and where the mixture is introduced into the furnace in such a way that a desired height or a desired range of heights of the layer of foamed slag develops and is maintained.

A method of this general type is disclosed by EP 0 637 634 A1. This previously known method can be used to produce a foamed slag on a metal bath, for example, on a bath composed of stainless metal. During the melting of the solid metal in an electric arc furnace, a slag forms that can contain a large fraction of Cr oxide. The concentration of this fraction often reaches values of greater than 30%. Due to their composition, slags of this type cannot be liquefied and foamed to the desired extent with the prior-art method. Similar solutions are disclosed by DE 26 08 320 B1, WO 01/72090 A1, WO 99/23264, and WO 2004/104232 A1.

The cited document describes the addition to the metal bath of a mixture that contains at least a metal oxide and carbon. In addition, the mixture can contain an iron carrier material and a binder. The mixture can be added to the bath compressed and in the form of pellets or briquettes. If the mixture is introduced into the region between the metal bath and the slag layer, it can chemically react there, and a metal oxide reduction process starts to occur. This process of reduction of the metal oxide with the carbon leads to the formation of gaseous carbon monoxide (CO), which results in bubble formation, which produces foaming of the slag.

The advantage of producing a foamed slag consists in the following: During the operation of an arc furnace, the charge, e.g., the scrap to be melted down, is melted in the furnace by means of the arc of the electrodes. In this connection, the slag fulfills not only its primary function of removing undesired constituents from the metal bath but also a protective function due to its foamed state. Specifically, the foamed slag at least partially fills the space between the ends of the electrodes and the surface of the molten metal and thus protects the refractory lining of the furnace from radiant energy of the electric arc.

Due to the low thermal conductivity of the foamed slag, the radiation of the electric arc towards the wall of the arc furnace is greatly reduced, and thus the energy input into the metal bath is improved.

Another advantage of the foamed slag is its noise muffling effect. The covered or enveloped electric arc thus emits less noise into the surroundings, which improves the environmental conditions in the vicinity of the furnace.

Although it is possible to produce a foamed slag with the prior-art method, a disadvantage is that exact control of the amount of foamed slag is difficult.

SUMMARY OF THE INVENTION

Therefore, the objective of the invention is to propose a method of the aforementioned type with which this disadvantage can be avoided. In other words, the objective of the invention is a method for producing foamed slag that can be better regulated or automatically controlled to produce an optimum amount of foamed slag.

In accordance with the invention, this objective is achieved by using an electric arc furnace or melting unit with electrodes as the metallurgical furnace, where, with a furnace wall with an essentially circular design as viewed from above and with an essentially central arrangement of at least one electrode of the furnace, the mixture is added to an annular area between the electrodes and the wall.

In other words, the height of the layer of foamed slag is systematically maintained at a desired level. A height range is understood to mean a permissible tolerance range for the height of the layer of foamed slag.

The mixture can be added either continuously or at predetermined time intervals.

An especially important aspect of the invention is the selection of the correct dosage of the mixture. It was found that optimum conditions for foaming prevail when the mixture is added in an amount of 3-20 kg per minute per metric ton of molten metal. The addition of the mixture at a rate of 5-15 kg per minute per metric ton of molten metal is especially preferred.

It was found that the area-specific delivery of mixture is also an important parameter. Therefore, in a modification of the invention, the mixture is added in such a way that an amount of mixture of 15-35 kg/m² is maintained on the surface of the metal bath. An amount of 20-30 kg/m² is especially preferred.

It is important for the mixture to act in the correct place. Therefore, it is advantageous to introduce the mixture between the metal bath and the slag.

It has been found to be advantageous if the mixture is added in the vicinity of the radial center of this annular area.

As is already well known in itself, it is possible to use a mixture that contains not only the metal oxide and carbon but also a carrier material composed of iron and chromium. In addition, it may contain a binder. The handling of the mixture is facilitated if it is present in the form of briquettes or pellets.

The procedure of the invention makes it possible for the amount of foamed slag to be held within desired limits, so that the advantageous effect of the foamed slag can be optimally exploited.

An embodiment of the invention is shown in the drawings.

DETAILED DESCRIPTION OF THE INVENTION

Figure 1:
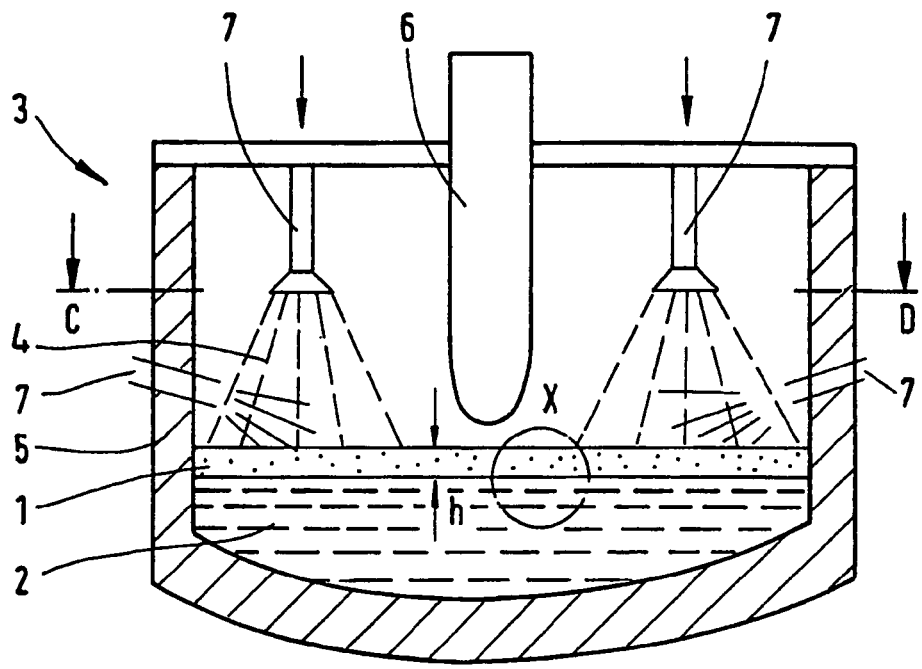
FIG. 1 shows an electric arc furnace along sectional line A-B in FIG. 2.
Figure 2:
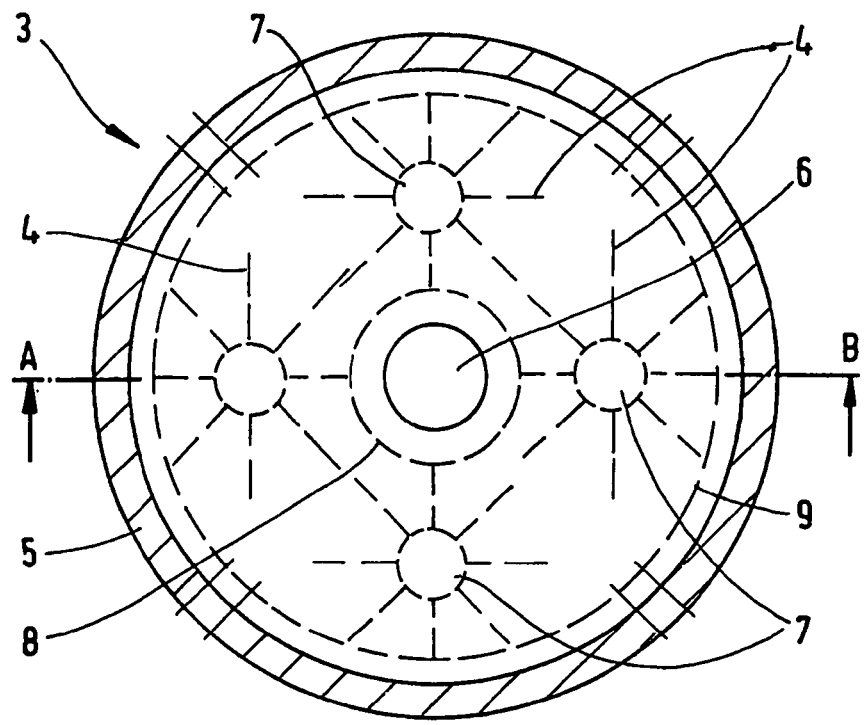
FIG. 2 shows the electric arc furnace along sectional line C-D in FIG. 1.

The electric arc furnace 3 illustrated in FIGS. 1 and 2 is used to melt a metal charge, i.e., to produce a metal bath 2. A layer of slag 1 is located on top of the metal bath 2. In the present case, the slag is to be foamed in order to realize the advantages cited above.

For this purpose, a mixture 4 that contains a metal oxide and carbon is added through suitable feeding devices 7. The mixture may also contain an iron-containing carrier material and a binder. The mixture is preferably compressed into briquettes or pellets. The broken lines running from the feeding devices 7 towards the metal bath 2 indicate how the pellets or briquettes are thrown down onto the surface of the slag or molten metal.

The specific gravity or compressed density of the mixture 4 is selected in such a way that optimum bubble formation occurs with respect to the intensity of the reaction and the duration of the process. In this regard, the specific gravity is selected in such a way that after the mixture 4 has been introduced into the furnace 3, it stays between the metal bath 2 and the slag 1. This is indicated in FIG. 3, which shows that the pellets or briquettes of mixture 4 sink below the foamed slag 1 and float on the metal bath 1.

Further details on this subject may be found in WO 2004/104232 A1.

Figure 3:
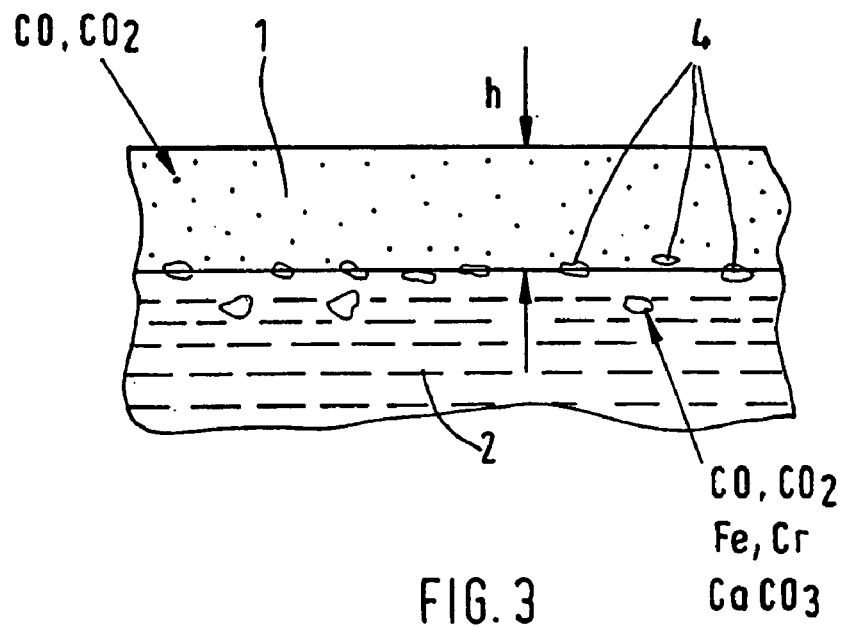
FIG. 3 shows detail X in FIG. 1.
Figure 4:
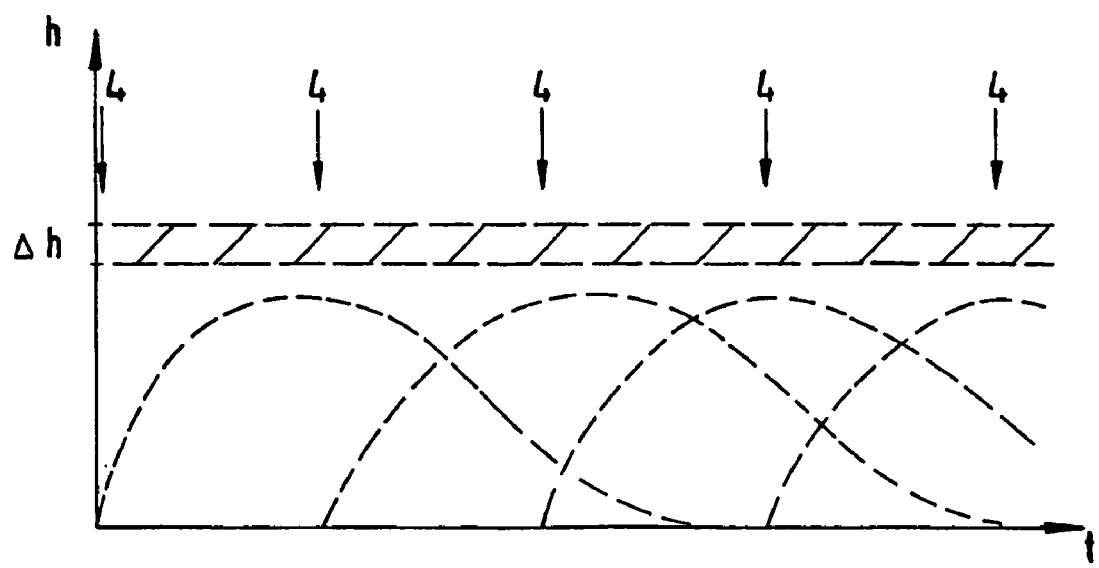
FIG. 4 shows the height h of the layer of foamed slag as a function of time.

As FIGS. 1 and 3 show, the foamed slag 1 has a height h that is to be maintained at a desired value or in a predetermined tolerance range. As specified above, to accomplish this, a suitable amount of mixture 4 is introduced into the furnace 3 per unit time per unit mass of molten metal 2. This can be done continuously or at predetermined time intervals. As indicated in FIG. 4, mixture 4 is introduced into the furnace 3 and thus onto the metal bath 2 at regular intervals (see the arrows labeled with reference number 4). Each addition of mixture 4 results in a chemical reaction, the course of which is indicated by the broken curves. The superposition of all reactions results in an overall reaction, which leads to a well-defined height h of the layer of foamed slag. In particular, the height h is maintained within a tolerance range Δh, as indicated in FIG. 4.

The intervals of time at which the mixture 4 is added are chosen in a way that ensures bubble formation that is as continuous as possible as a result of the superposition of the individual partial reactions.

In general, it can be said that the reaction of the mixture proceeds nonlinearly, and the foamed slag is formed accordingly. The mixture 4 introduced between the foamed slag 1 and the metal bath 2 is subject to a dissolving process with parallel reduction of the iron oxide. As soon as particles of mixture dissolve out of the pellet or briquette due to the ambient temperature, they become covered with a shell of solidified metal. Due to the fact that the mean melting point of the particle is lower than that of the metal, a melting process and the chemical reactions of the material take place inside the shell. Depending on the temperature difference, the reaction within the shell ends either before or after the melting of the shell. In the former case, the process can lead to bursting of the particle, which results in the explosive liberation of a CO bubble. In the latter case, the CO bubble will evolve freely in the metal.

In this process, the following chemical reaction, for example, takes place:

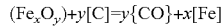

$(Fe_xO_y) + y[C] = y\{CO\} + x[Fe]$

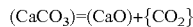

$(CaCO_3) = (CaO) + \{CO_2\}$

Optimum results can be obtained if the mixture is added in an amount of 5-15 kg per minute per metric ton (1,000 kg) of molten metal. A mixture that contains 40-70 wt. %, and preferably 50-60 wt. %, of FeCrHC is preferably used.

FIG. 2 further shows that the four feeding devices 7 illustrated here feed the mixture onto an annular area of the slag 1 or metal bath 2. The annular area is formed on the radially inner side by the circularly conceived envelope 8 surrounding the electrode 6 or electrodes (inner circle). The outer circle 9 of the annular area is adjacent to the wall 5 of the furnace 3. The mixture is thus introduced in an annular area between the wall 5 of the furnace and the one or more electrodes 6. In this regard, the mixture 4 is preferably added approximately in the radial center between the inner circle 8 and the outer circle 9, as indicated in FIG. 2. In a suitable alternative, additions are made by laterally positioned feeding devices.

The area-specific delivery of a certain weight of mixture has also been recognized as an important parameter. The invention proposes a preferred value for this of 20-30 kg of mixture per square meter of surface area.

An optimum foaming result is thus achieved if, first, a favorable frequency of addition of the mixture is selected (i.e., the amount of mixture per unit time per mass of molten metal), second, the mixture is distributed on the surface of the slag or metal bath in a pattern that is as close as possible to an annular pattern, and, finally, the mixture is added in the specified area-specific amount.

This makes it possible to maintain a desired height of foamed slag as a function of time, which has the aforementioned advantageous effect.

LIST OF REFERENCE SYMBOLS 1 slag/foamed slag
2 metal bath
3 metallurgical furnace
4 mixture
5 wall
6 electrode
7 feeding device
8 inner circle (envelope surrounding the electrodes)
9 outer circle
h height of the foamed slag
Δh tolerance range of the height h

The invention claimed is:

1. A method for producing a foamed slag (1) in a metal bath (2) in a metallurgical furnace (3), in which a mixture (4) that contains at least a metal oxide and carbon is introduced into the furnace (3), where below the slag (1) present in the furnace, the metal oxide is reduced by the carbon, where the gases formed during the reduction form bubbles in the slag, thereby foaming the slag, and where the mixture (4) is introduced into the furnace (3) in such a way that a desired height (h) or a desired range of heights (h) of the layer of foamed slag (1) develops and is systematically maintained, wherein an electric arc furnace or melting unit with electrodes is used as the metallurgical furnace (3), where, with a wall (5) of the furnace (3) with an essentially circular design as viewed from above and with an essentially central arrangement of at least one electrode (6) of the furnace (3), the mixture (4) is added to an annular area between the electrodes (6) and the wall (5) from above at a plurality of positions uniformly spaced along a circle substantially at the radial center of the annular area.

2. A method in accordance with claim 1, wherein the mixture (4) is added continuously.

3. A method in accordance with claim 1, wherein the mixture (4) is added at predetermined intervals of time.

4. A method in accordance with claim 1, wherein the mixture (4) is added in an amount of 3-20 kg per minute per metric ton of molten metal (2).

5. A method in accordance with claim 4, wherein the mixture (4) is added in an amount of 5-15 kg per minute per metric ton of molten metal (2).

6. A method in accordance with claim 1, wherein the mixture (4) is added in such a way that an amount of mixture of 15-35 kg/m.sup.2 is maintained on the surface of the metal bath (2).

7. A method in accordance with claim 6, wherein the mixture (4) is added in such a way that an amount of mixture of 20-30 kg/m.sup.2 is maintained on the surface of the metal bath (2).

8. A method in accordance with claim 1, wherein the mixture (4) is introduced between the metal bath (2) and the slag (1).

9. A method in accordance with claim 1, wherein the mixture (4) also contains a carrier material composed of iron and chromium.

10. A method in accordance with claim 1, wherein the mixture (4) also contains a binder.

11. A method in accordance with claim 1, wherein the mixture (4) is present in the form of briquettes or pellets.

* * * * *